United States Patent

Browne

Patent Number: 5,409,107
Date of Patent: Apr. 25, 1995

[54] COMPUTER MOUSE HOLDER

[76] Inventor: Patricia Browne, 602 Boulder Cir., Dayton, Nev. 89403

[21] Appl. No.: 170,756

[22] Filed: Dec. 21, 1993

[51] Int. Cl.⁶ .............................................. B65D 85/38
[52] U.S. Cl. ................................... 206/305; 206/320; 220/348; 248/346; 248/918; 345/163; 345/166
[58] Field of Search ............... 206/305, 320; 220/243, 220/246, 264, 348; 224/252, 253, 901; 340/706, 709, 710; 248/918, 346; 345/163, 166; 361/683, 686

[56] References Cited

U.S. PATENT DOCUMENTS

| | | | |
|---|---|---|---|
| D. 291,203 | 8/1987 | Silver | D14/114 |
| D. 304,180 | 10/1989 | Gibson | D14/114 |
| D. 305,424 | 1/1990 | Pressley, Sr. | D14/114 |
| D. 331,045 | 11/1992 | Moerke | D14/114 |
| 1,905,955 | 4/1933 | Waehner | 220/348 X |
| 3,813,017 | 5/1974 | Pimsleur | 224/901 X |
| 4,747,570 | 5/1988 | Takahashi | 248/346 X |
| 4,831,736 | 5/1989 | Bryant, Sr. | 340/710 X |
| 4,951,817 | 8/1990 | Barletta et al. | 206/305 |
| 5,203,845 | 4/1993 | Moore | 248/918 X |

Primary Examiner—Bryon P. Gehman

[57] ABSTRACT

A computer mouse holder including a pocket which attaches to a component of a computer system by a coacting cohesive fastener and a spring loaded closure for the purpose of retaining the computer mouse within the pocket. An alternate embodiment comprises a computer mouse pocket and a detachable computer mouse cleaning member.

9 Claims, 4 Drawing Sheets

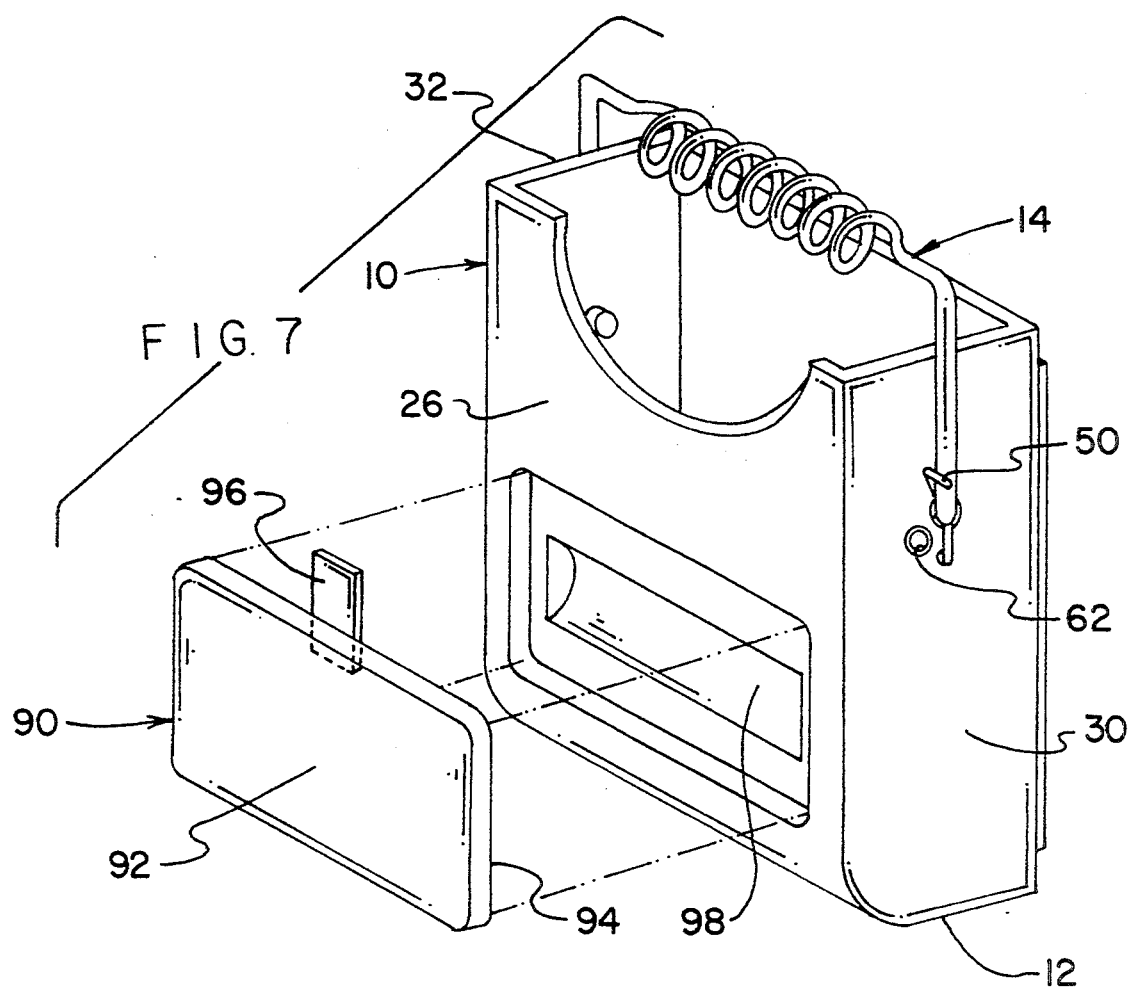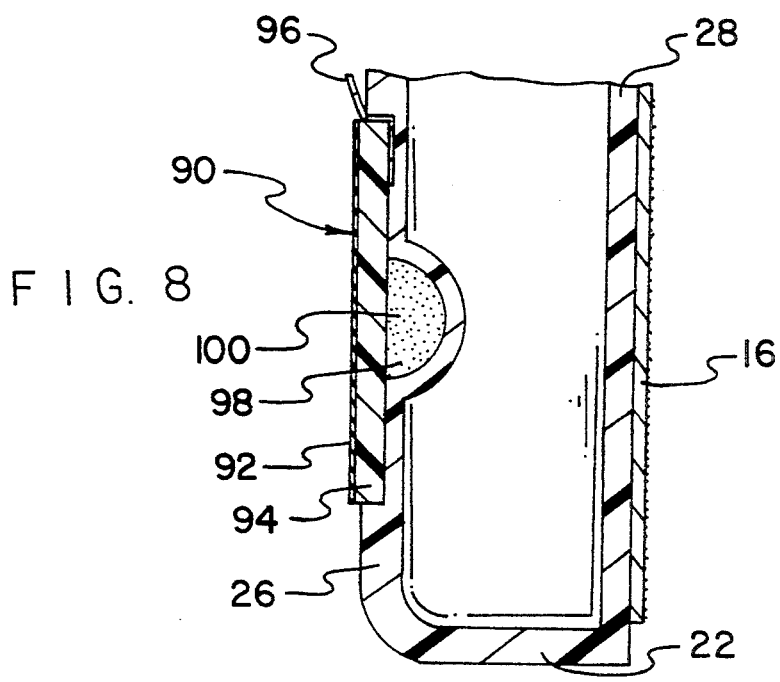

COMPUTER MOUSE HOLDER

BACKGROUND OF THE INVENTION

1. Field of the Invention

The present invention relates to computer mouse holders and more particularly pertains to a computer mouse holder which may be utilized for temporary storage of a computer mouse on a surface of a computer component.

2. Description of the Prior Art

The use of a computer mouse holder is known in the prior art. More specifically, computer mouse holders heretofore devised and utilized for the purpose of temporary storage of a computer mouse on a surface of a computer component are known to consist basically of familiar, expected and obvious structural configurations, notwithstanding the myriad of designs encompassed by the crowded prior art which have been developed for the fulfillment of countless objectives and requirements.

For example, U.S. Pat. Nos. 331,045 to Moerke discloses the ornamental design of a combined computer keyboard and mouse pad drawer in which a keyboard and mouse pad are used or stored. The Moerke design patent does not include storage provisions for a computer mouse and there is no provision for affixing the mouse in a convenient location on the computer hardware whenever storage is desired. The present invention provides a protective enclosure for the computer mouse whenever desired and independently of computer keyboard storage.

In U.S. Pat. No. 4,831,736 to Bryant, Sr. a carriage for a computer mouse is disclosed. The Bryant, Sr. invention comprises a means for utilization of the computer mouse for following lines by crosshair coincidence and a means for maintaining alignment of the computer mouse with respect to orthogonally disposed lines by pivoting a set of four linked wheels. The Bryant Sr. patent does not provide any advantage of temporary computer mouse storage and is only of utility when the computer mouse is operationally disposed. The present invention discloses a computer mouse holder which provides for safe temporary storage of a computer mouse.

In U.S. Pat. No. 291,203 to Silver the ornamental design of a cover for a computer mouse which is generally employed during use and has no significant benefit during temporary storage of the computer mouse is described. Employment of the present invention has the advantage of removal of the mouse from the immediate work area during temporary storage and additionally the affixation of the mouse interconnecting cable in a manner which precludes damage during activities around and near the computer system.

In U.S. Pat. No. 305,424 to Pressley, Sr. the ornamental design for a combination drawing pen and enclosure for a computer mouse for generating free hand computer graphics is disclosed. A disadvantage in this prior art lies in a lack of a means for storing the computer mouse when not in use. While the Pressley, Sr. invention provides a computer mouse housing of operational utility the present invention has the advantage of housing the computer mouse in less accessible location on a computer system surface such as the side of the computer monitor.

In U.S. Pat. No. 304,180 to Gibson the ornamental design for a retainer for a computer mouse is disclosed. A disadvantage in this prior art lies in a lack of a spring-like provision for holding the computer mouse and associated cable and the absence of computer mouse cleaning provisions.

As illustrated by the background art, efforts are continuously being made to attempt to improve methods of holding and using a computer mouse. No prior effort, however, provides the benefits attendant with the present invention. Additionally, the prior patents and commercial techniques do not suggest the present inventive combination of component elements arranged and configured as disclosed and claimed herein.

Therefore, it can be appreciated that there exists a continuing need for a computer mouse holder which can be employed to provide for temporary storage of the computer mouse. In this regard, the present invention substantially fulfills this need.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types now present in the prior art, the present invention provides an improved computer mouse holder construction wherein the same can be utilized for temporary storage of the computer mouse. As such, the general purpose of the present invention, which will be described subsequently in greater detail, is to provide a new and improved computer mouse holder apparatus and method which has all of the advantages of the prior art computer mouse holder methods and none of the disadvantages.

The invention is defined by the appended claims with the specific embodiment shown in the attached drawings. For the purpose of summarizing the invention, the invention may be incorporated into an opened pocket attaching in a preferred, open end upward orientation to a component of a computer system using adhesively attachable hook and loop style fastening means. A spring energized detent modulated device pivoting about an axis through opposing locations on the lesser sides of the open pocket and comprising a heavy gauge wire having a central portion formed into a spiral is operationally disposed to hold the computer mouse cord thereby reducing stress loads at a critical mouse cord junction and additionally to secure the computer mouse within the pocket during potentially disruptive activities around and near the computer system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention may be better understood so that the present contribution to the art can be more fully appreciated. Additional features of the invention will be described hereinafter which form the subject of the claims of the invention. It should be appreciated by those skilled in the art that the conception and the disclosed specific methods and structures may readily be utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved computer mouse holder.

It is an additional object of the present invention to provide a new and improved computer mouse holder which has all the advantages of the prior art and none of the disadvantages.

It is another object of the present invention to provide a new and improved computer mouse holder which may be easily and efficiently manufactured and marketed.

It is a further object of the present invention to provide a new and improved computer mouse holder which is of a durable and reliable construction.

An even further object of the present invention is to provide a new and improved computer mouse holder which is susceptible of a low cost of manufacture with regard to both materials and labor, and which accordingly is then susceptible of low prices of sale to the consuming public, thereby making such computer mouse holders economically available to the buying public.

Still yet another object of the present invention is to provide a new and improved computer mouse holder which provides in the apparatuses and methods of the prior art some of the advantages thereof, while simultaneously overcoming some of the disadvantages normally associated therewith.

Still another object of the present invention is to provide a new and improved computer mouse holder which serves a purpose of providing secure temporary storage of the computer mouse when not in use.

Yet another object of the present invention is to provide a new and improved computer mouse holder which incorporates a spiral computer mouse cord holder which provides protection from damage incurred by dropping the computer mouse or snagging the cord during activities near and around a computer system to which the computer mouse is attached thereby providing the computer operator with enhanced life and reliability of the computer mouse and associated hardware.

Even still another object of the present invention is to provide a new and improved computer mouse holder comprising a secure temporary storage site for the computer mouse and having a computer mouse cleaning aid feature thereby having a beneficial impact on the computer industry in general.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding may be had by referring to the summary of the invention and the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a partially exploded right perspective view of the alternate embodiment of the computer mouse holder in the closed position.

FIG. 8 is a fragmentary sectional view of the alternate embodiment of the computer mouse holder taken substantially on the plane indicated by the section line 8—8 of FIG. 6.

OF THE PREFERRED EMBODIMENT

Figure 1:
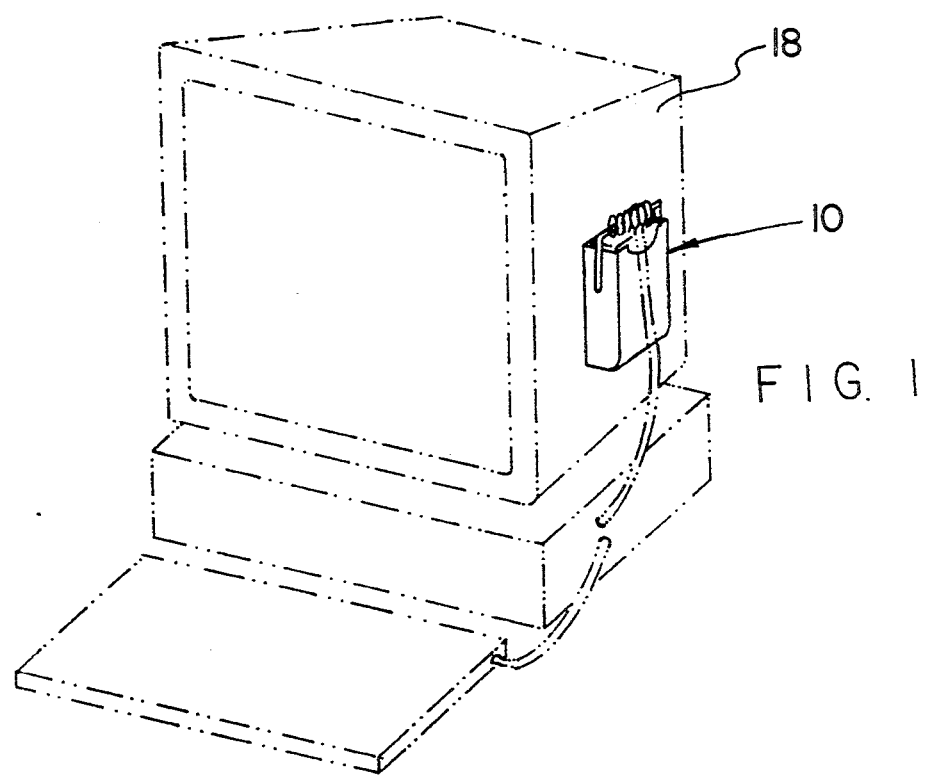
FIG. 1 is a perspective view of the computer mouse holder in a computer operational environment with a computer mouse in the holder pocket.

With reference now to the drawings, and in particular to FIG. 1 thereof, a new and improved computer mouse holder embodying the principles and concepts of the present invention and generally designated by the reference numeral 10 will be described.

Figure 2:
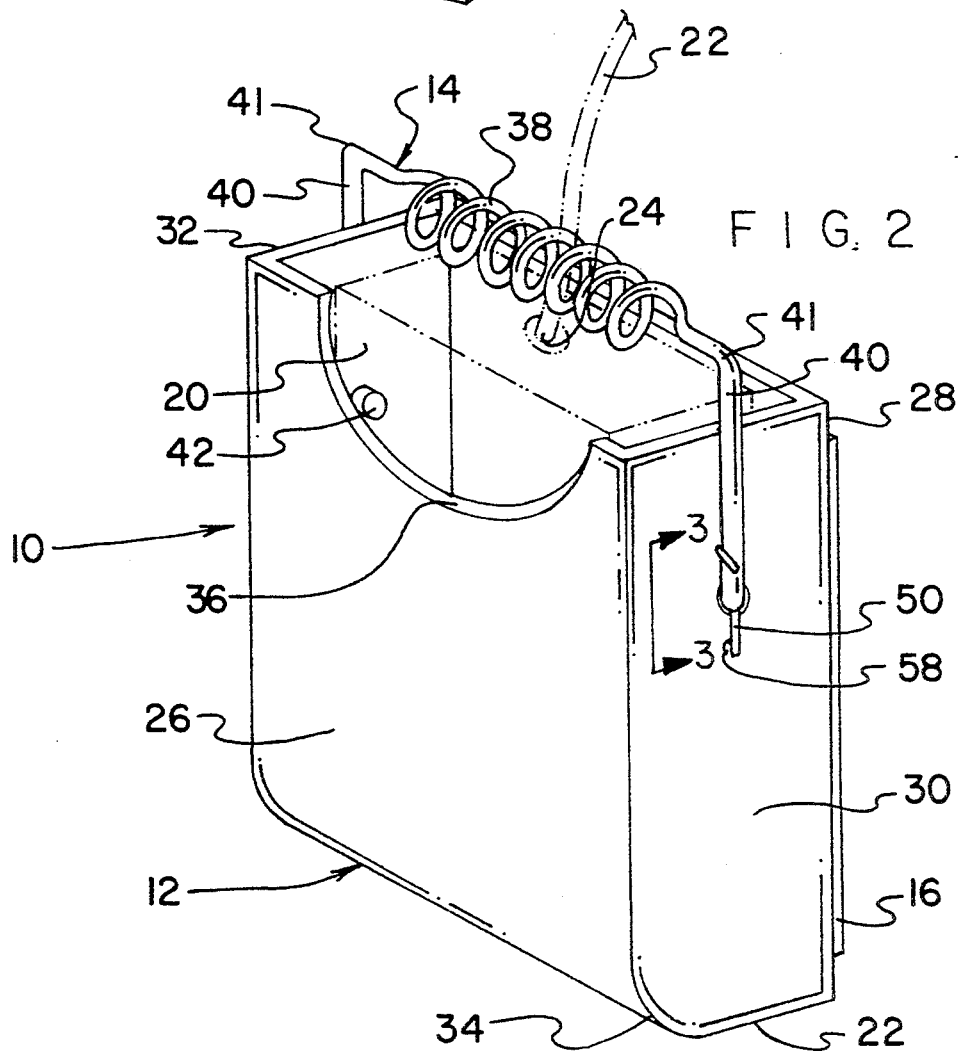
FIG. 2 is a right perspective view of the computer mouse holder in the closed position.

From an overview standpoint, the computer mouse holder 10 is adapted for use by a human to temporarily store a computer mouse in a secure location and on a surface of a computer system component. See FIGS. 1 and 2. The computer mouse holder 10 comprises an open ended pocket 12, a pivoting closure device 14, and attachment means 16. The computer mouse holder 10 is affixed to computer component 18 by attachment means 16 in an orientation such that a computer mouse 20 will slip into the computer mouse holder 10 and rest at the bottom of pocket 12 under the action of gravity. After the computer mouse 20 is emplaced in pocket 12 the pivoting closure device 14 is rotated to preclude extraction of the computer mouse 20 from pocket 12. Pivoting closure device 14 also holds computer mouse interface cord 22 thereby providing added strain relief at the critical cord attachment point 24.

More specifically, it will be noted that the computer mouse holder pocket 12 comprises a front portion 26, a rear portion 28, a right portion 30, a left portion 32, and a bottom portion 22. See FIG. 2. Pocket 12 construction may be polymeric such as injection molded polyvinyl, or be otherwise composed of rigid or semi-rigid materials such as wood or resin matrix fiberglass. Front portion 26 and bottom portion 22 may be joined by a curved portion 34 or may be joined at a sharp right angle. Front portion 26 comprises scalloped section 36 which permits access to computer mouse 20 for insertion and removal.

Figure 3:
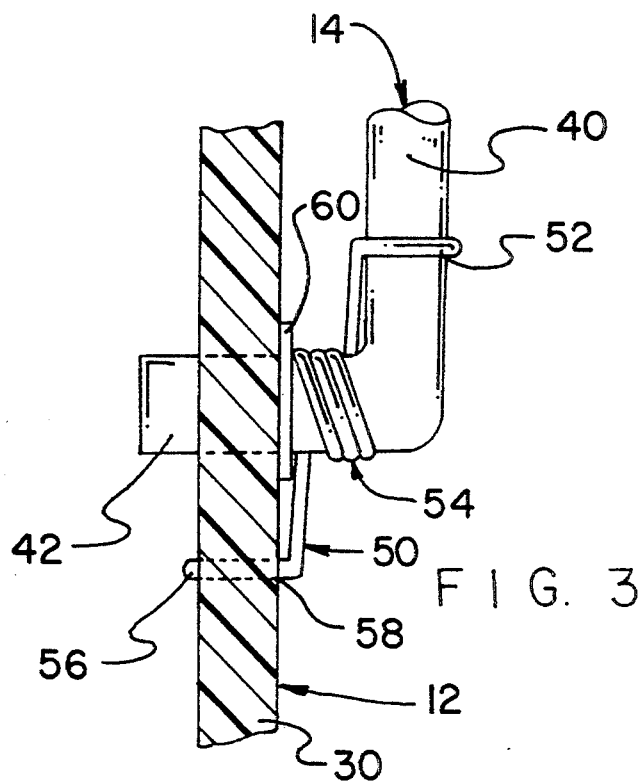
FIG. 3 is a fragmentary sectional view of the computer mouse holder taken substantially on the plane indicated by the section line 3—3 of FIG. 2.
Figure 4:
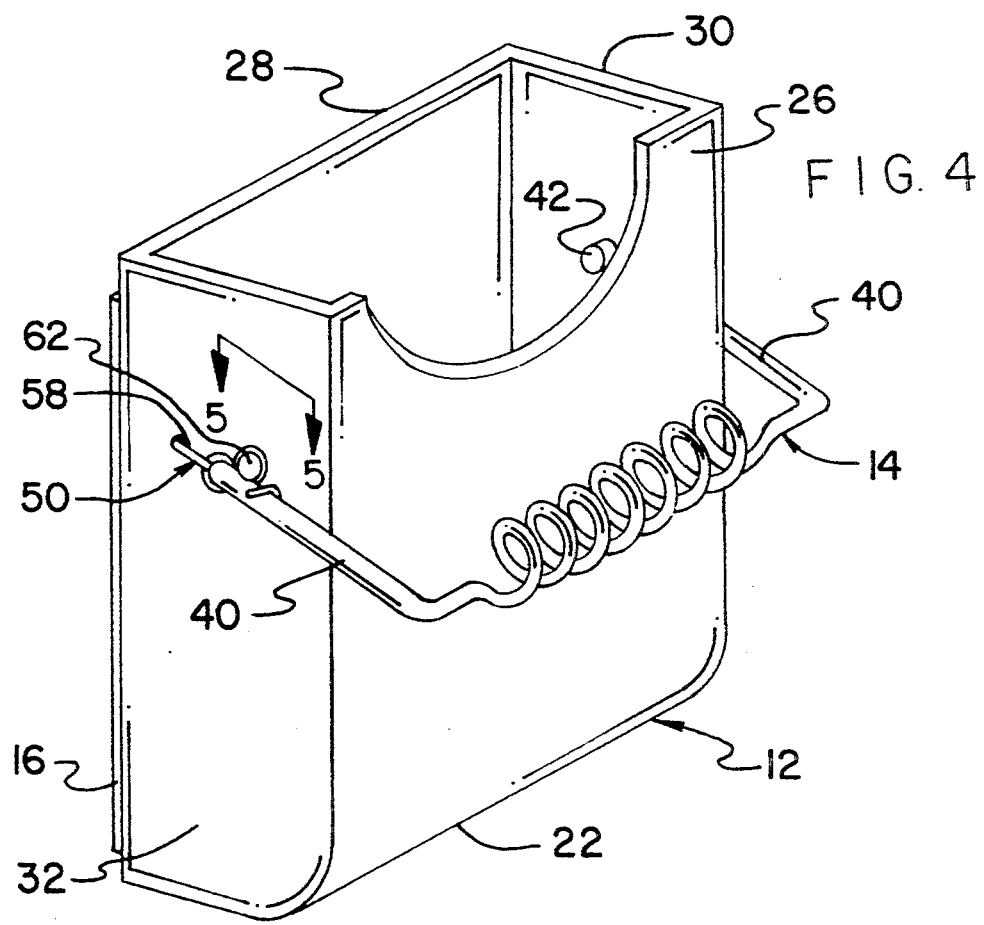
FIG. 4 is a left perspective view of the computer mouse holder in the open position.

Pivoting closure device 14 comprises a resilient circular cross section material such as a metallic or polymeric heavy gauge wire having a central portion formed into a multi-turn spiral 38, extensions 40 being bent at a right angle 41 and terminating in axle stubs 42. See FIGS. 3 and 4. A spring 50 provides restoring energy to maintain closure device 14 in the closed position and having a formed leg portion 52 engaging extension 40 and providing restoring force to extension 40, a central spiral resilient portion 54, and a formed leg portion 56 which passes through hole 58 in right portion 30 of pocket 12 thereby providing a fixed reference for spring 50 restoring force. Washer 60 is included to provide a spacing and bearing surface for spring 50 thereby precluding marring and damage to right portion 30.

Figure 5:
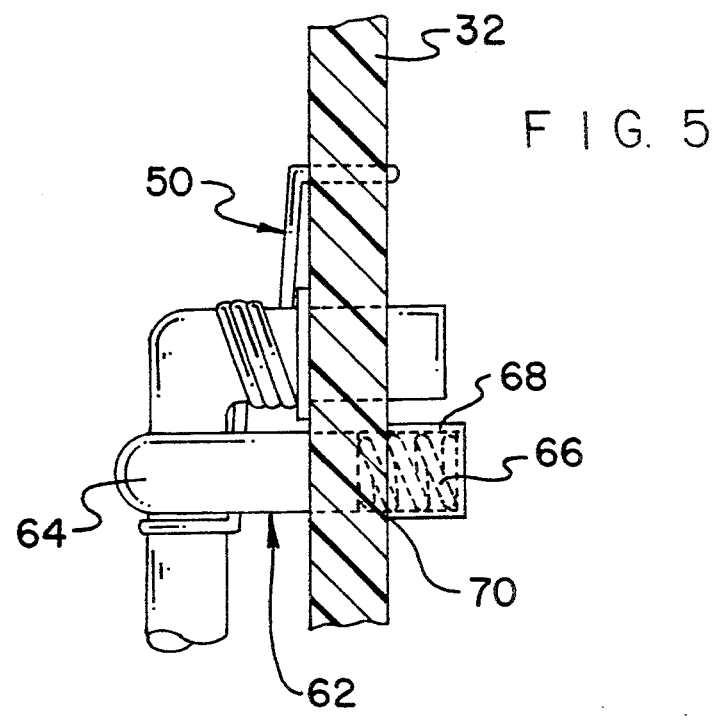
FIG. 5 is a fragmentary sectional view of the computer mouse holder taken substantially on the plane indicated by the section line 5—5 of FIG. 4.

A similar spring 50, differing in having a left handed quality, and washer 60 are provided for extension 40 engaging the left portion of pocket 12. Closure device 14 is capable of being held against spring 50 force in the open position shown in, FIG. 4, for an indefinite period by detent 62. See FIG. 5.

Detent 62 comprises a captive plunger 64, a helical compression spring 66, and a retainer cup 68. Retainer cup 68 is cemented or otherwise affixed to through hole 70 positioned on pocket 12 left portion 32, or right portion 30, or both right portion 30 and left portion 32 such that the hole center is closest to front 26. Detent 62 is generally disposed in an extended position by spring 66 and interferes with rotational travel of extension 40. This interference is operationally employed to preclude movement of closure device 14 to a closed position being the resulting position for said closure device 14 under the influence of one or more springs 50. Depression of all captive plungers 64 by the user enables release and rotation of closure device 14 to the closed position under the influence of at least one spring 50.

Attachment means 16 comprises coacting cohesive fasteners wherein one portion of a coacting cohesive fastener 20, such as a portion having minute hook-like projections, is applied to computer hardware component 18 and the complementary coactive portion of the cohesive fastener 20, such as a portion having a pile section, is secured to the rear portion 28 of pocket 12. Coacting cohesive fasteners 20 provide the user with a capability to remove and replace the computer mouse holder, however permanent attachment may also be desired wherein the cohesive fastener 20 comprises a singly acting adhesive such as tape or glue.

Figure 6:
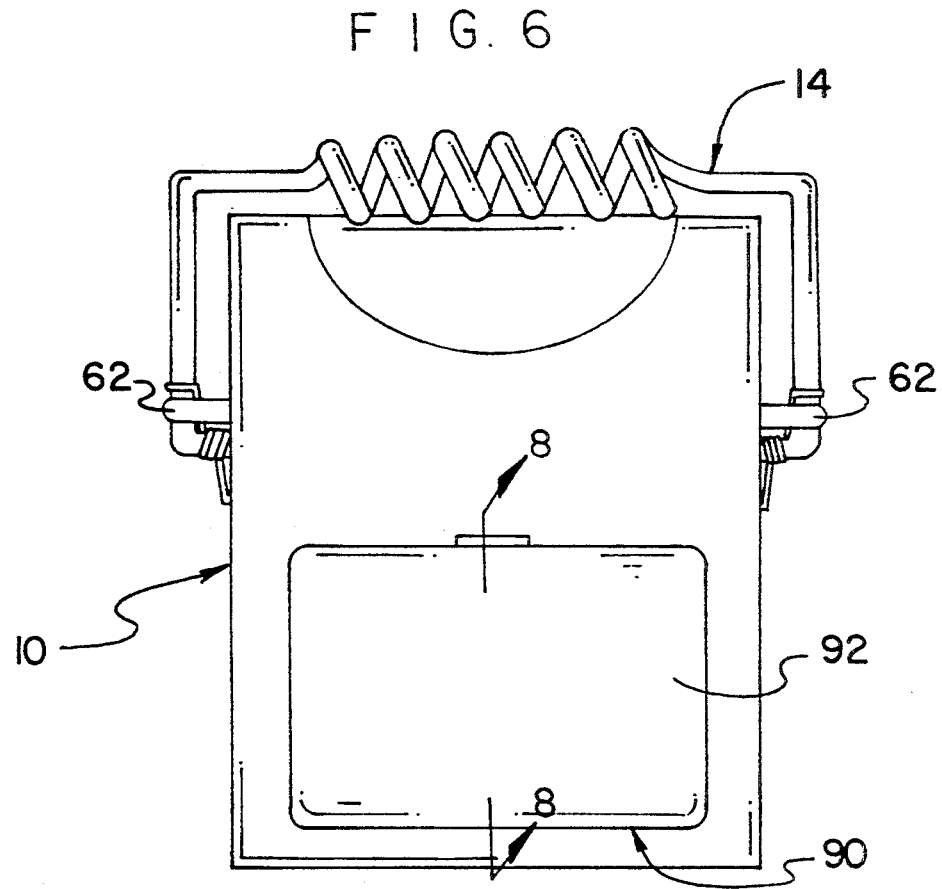
FIG. 6 is a front elevational view of an alternate embodiment of the computer mouse holder in the closed position.

In an alternate embodiment the computer mouse holder 10 is provided with a detachable computer mouse cleaning member 90. See FIGS. 6, 7, and 8. Detachable cleaning member 90 comprises an outer portion 92, an inner portion 94, and a finger tab 96. Outer portion 92 comprises a fabric material known for it's effectiveness in cleaning the computer mouse 20 sliding and rotating components. Finger tab 96 enables the user to remove the detachable cleaning member 90 for the purpose of cleaning the computer mouse 20 and to expose a recess 98 into which cleaning aids such as consolidated powders 100 are stored. Recess 98 may be an elongated semi-cylindrical cavity or an alternate cavity shape may be employed as required by the exact nature of cleaning material stored.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A computer mouse holder for temporary storage of a computer mouse, said holder comprising:
   a five sided pocket having a joined front member, rear member, right member and left member;
   a pivotally attached pocket closure means for selectively precluding extraction of a computer mouse from said pocket;
   spring means coupled to said pocket closure means for biasing said pocket closure means in a predetermined direction; and,
   a cohesive fastening means affixing the pocket rear member to a component of a computer system.

2. The computer mouse holder of claim 1, wherein said pocket front member has a portion removed defined by a circle segment at an upper end of said front member.

3. The computer mouse holder of claim 1, and further comprising a detent means for selectively preventing said pivotally attached pocket closure means from closing said pocket.

4. The computer mouse holder of claim 3 wherein said detent means comprises:
   a plunger member which when extended stops rotational motion of the pocket closure means and which is depressed by finger pressure to release said closure means to the closed state;
   a compression spring which, in the absence of outside influence through the plunger member, maintains the plunger member in an extended state; and
   a cup retaining the plunger member and compression spring.

5. The new and improved computer mouse holder of claim 1 in which the cohesive fastening means is coacting.

6. The computer mouse holder of claim 5 in which the coacting cohesive fastening means comprises a pile section secured to the rear member of the pocket and a hook section secured to the component of the computer system.

7. The computer mouse holder of claim 5 in which the coacting cohesive fastening means comprises a pile section secured to the component of the computer system and a hook section secured to the rear member of the pocket.

8. A computer mouse holder for temporary storage of a computer mouse, said holder comprising:
   a pocket for holding a computer mouse; and
   a computer mouse cleaning means removably secured to said holder for cleaning a portion of a computer mouse, wherein the computer mouse cleaning means comprises a detachable member having at least one surface treated with a material operable for cleaning a computer mouse, the computer mouse cleaning means being supplemented by a cleaning medium stored in a cavity formed within the computer mouse holder.

9. The computer mouse holder of claim 8 in which the computer mouse cleaning medium storage cavity is an elongate semi-cylinder.

* * * * *